(12) United States Patent
Yamaoka

(10) Patent No.: US 6,785,462 B1
(45) Date of Patent: Aug. 31, 2004

(54) RECORDING AND REPRODUCING APPARATUS

(75) Inventor: Masato Yamaoka, Tokyo (JP)

(73) Assignee: Sony Corporation, Tokyo (JP)

( * ) Notice: Subject to any disclaimer, the term of this patent is extended or adjusted under 35 U.S.C. 154(b) by 694 days.

(21) Appl. No.: 09/616,713

(22) Filed: Jul. 14, 2000

(30) Foreign Application Priority Data

Jul. 16, 1999 (JP) ............................................ 11-203658

(51) Int. Cl.$^7$ .......................... H04N 5/91; H04N 5/76; H04N 11/00; H04N 5/84
(52) U.S. Cl. ............................ 386/46; 386/120; 386/1; 386/129
(58) Field of Search ............................. 386/1, 46, 124, 386/125, 126, 107, 117, 131, 129, 120, 92, 35, 38, 40, 45, 81, 68, 69; H04N 5/91, 5/76, 11/00, 5/84

(56) References Cited

U.S. PATENT DOCUMENTS 5,475,498 A * 12/1995 Radice ........................ 386/112
5,568,204 A * 10/1996 Takamori ..................... 348/705

FOREIGN PATENT DOCUMENTS

EP 0549108 * 6/1993

* cited by examiner

*Primary Examiner*—Robert Chevalier
(74) *Attorney, Agent, or Firm*—Frommer Lawrence & Haug LLP; William S. Frommer; Darren M. Simon

(57) ABSTRACT

The object of the present invention is to convert a signal from an arbitrary equipment into a signal at a data rate for used in a device.

A semiconductor memory (7) is controlled by a control signal from a memory control section (8), thereby repeatedly reproducing recorded still image signals each corresponding to one frame. If a reproduction signal has a data rate of 4:4:4, the reproduction signal is supplied to a rate conversion circuit (9) for converting the data rate into 4:2:2 or 4:1:1. A digital video signal thus converted is supplied to a VTR section (6) through a change-over switch (5). One of the digital video signal from the rate conversion circuit (9) and the reproduction digital video signal from the VTR section (6) is selected by a switch (10). The selected digital video signal is supplied to a D/A conversion circuit (11) and fetched a digital output terminal (12). An analog video signal converted by the D/A conversion circuit (11) is supplied to a display section (13) consisting of a liquid crystal display unit or the like and built in the device and fetched at an analog output terminal (14).

20 Claims, 6 Drawing Sheets

FIG. 3
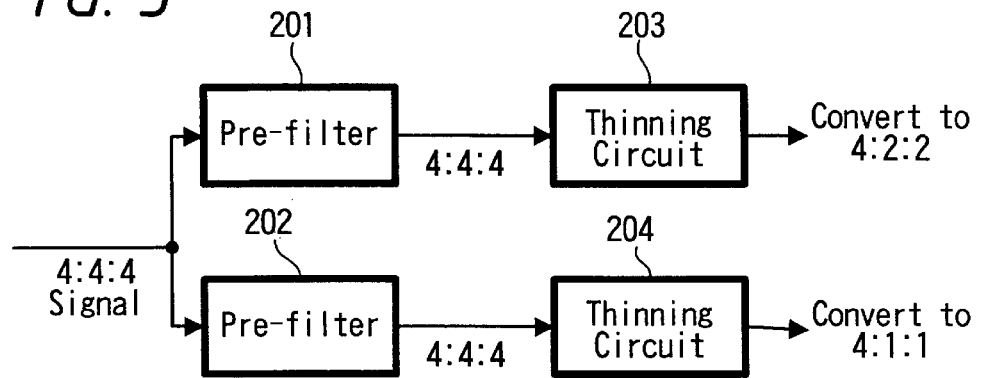
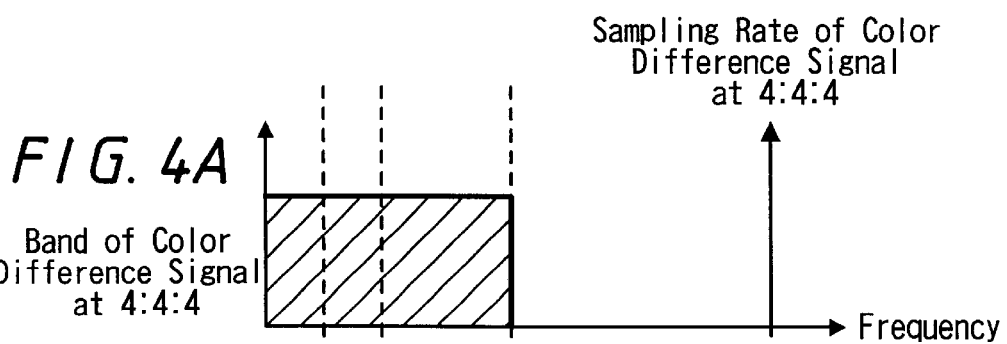
FIG. 4A
Band of Color
Difference Signal
at 4:4:4
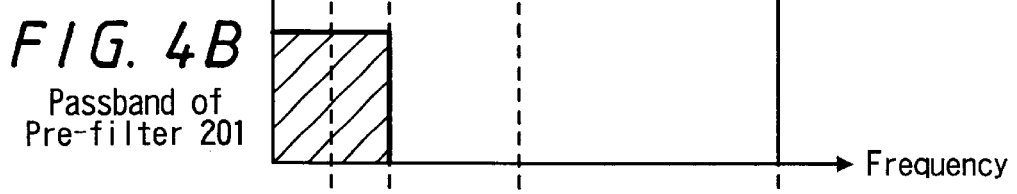
FIG. 4B
Passband of
Pre-filter 201
FIG. 4C
Passband of
Pre-filter 202

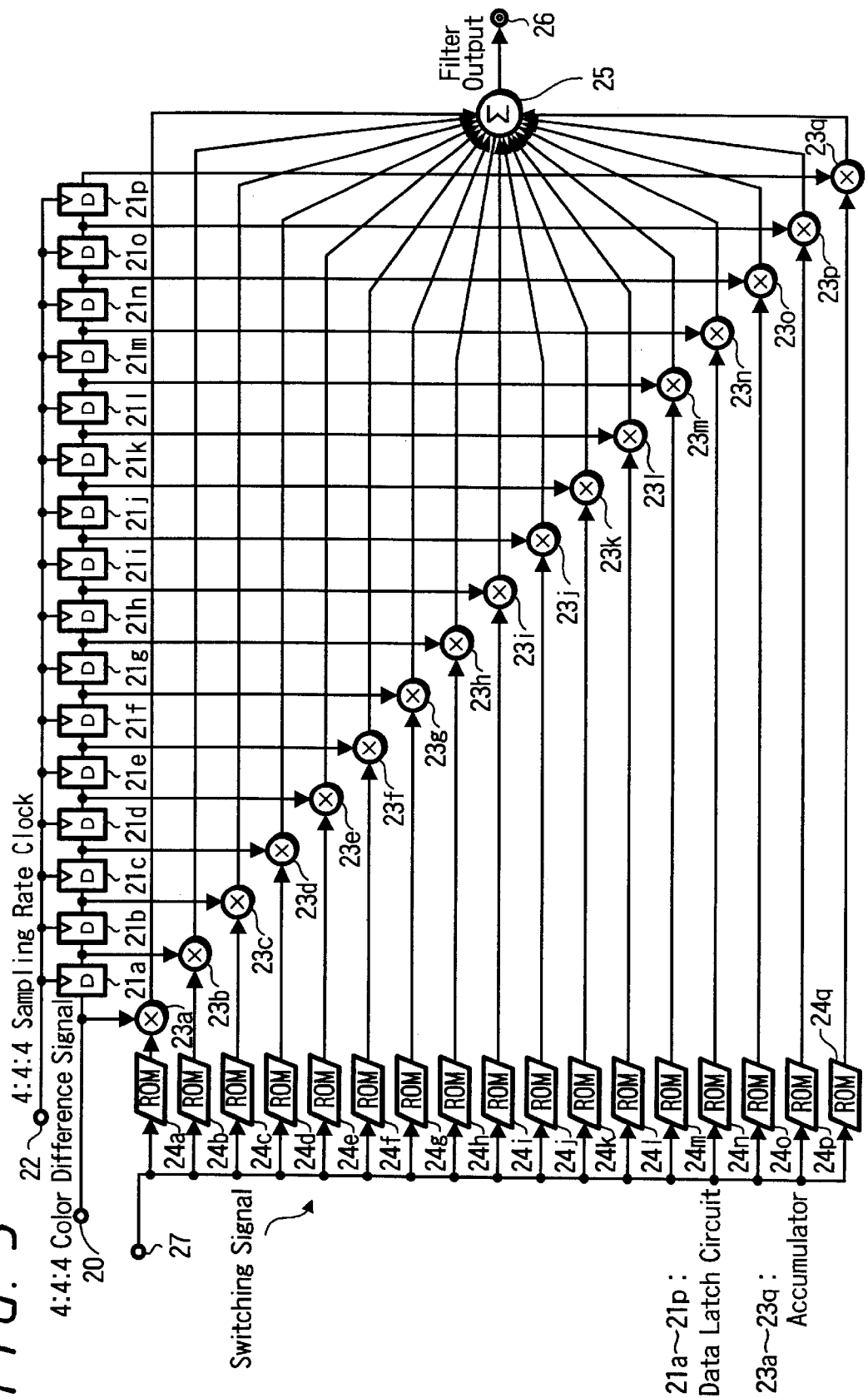

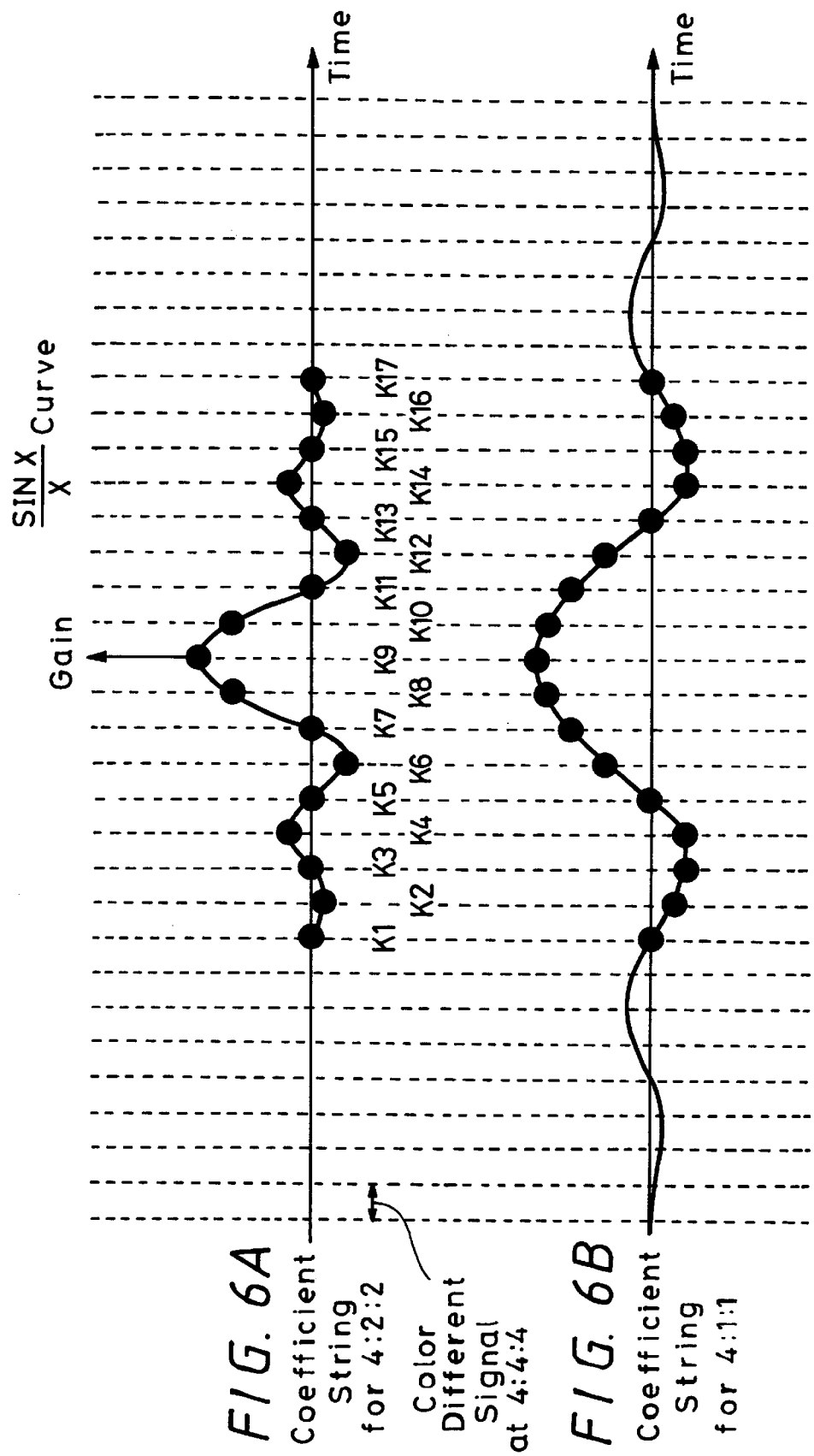

FIG. 7
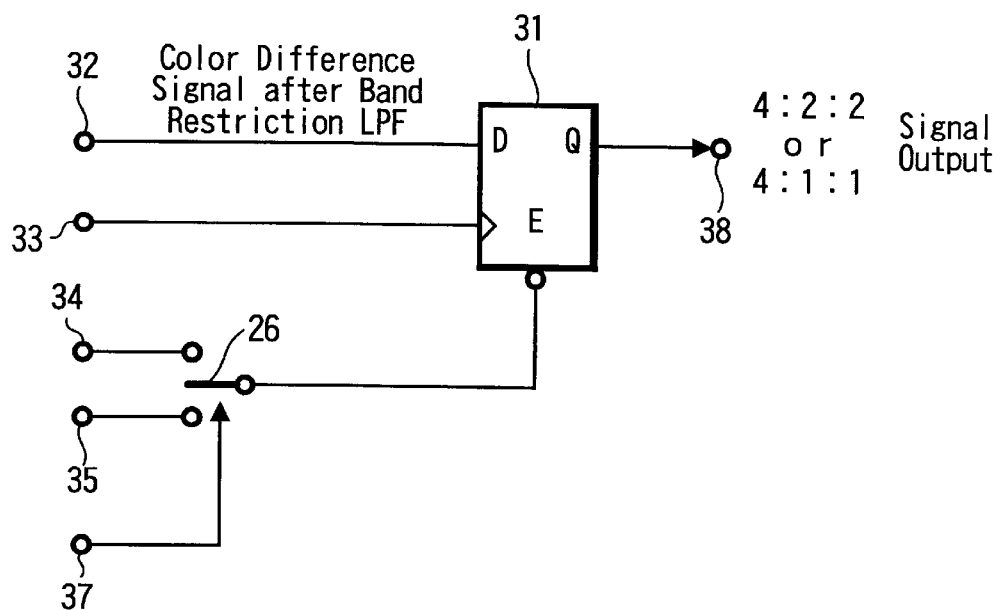
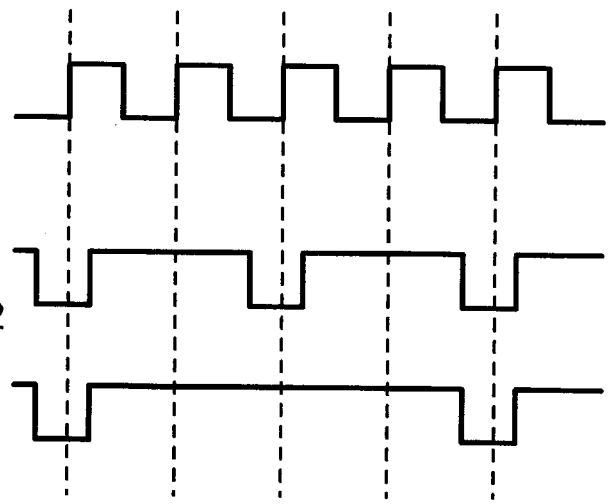
FIG. 8A
Clock
FIG. 8B
Sampling Pulse for 4:2:2
FIG. 8C
Sampling Pulse for 4:1:1

RECORDING AND REPRODUCING APPARATUS

BACKGROUND OF THE INVENTION

1. Field of the Invention

The present invention relates to a recording and reproducing apparatus suited for use in a digital camcorder or the like employing a semiconductor memory as well as a magnetic recording medium. The present invention particularly relates to allowing a still image signal recorded at, for example, different data rate and supplied from a semiconductor memory or the like, to be captured at the data rate of, for example, a video signal.

2. Description of the Related Art

For a digital camcorder, a recording and reproducing apparatus into which a semiconductor memory as well as a magnetic recording medium (videocassette) for recording existing moving images can be installed and which records still images on the semiconductor memory, is employed. According to the recording and reproducing apparatus of this type, a semiconductor memory compatible with a semiconductor memory used in a so-called personal computer is installed, whereby still images picked up by, for example, a camcorder can be easily captured into the personal computer or the like.

For ordinary digital type video signals, a data rate represented by a ratio of luminance signal (Y): first color signal (R-Y): second color signal (B-Y) of 4:2:2 (NTSC) or 4:1:1 (PAL) is often used due to the relationship with transmission rate and the like. This data rate is also used for, for example, a camcorder. For still image signals processed by, for example, a personal computer, by contrast, a data rate of, for example, 4:4:4 is sometimes used.

On the other hand, the above-stated camcorder displays still images processed by the personal computer on an built-in display unit through a semiconductor memory and records the still images on a video cassette at intervals of predetermined time. In that case, if the data rate of the still images processed by the personal computer is 4:2:2 or 4:1:1, no problems surface. With the data rate of 4:4:4, however, a conventional recording and reproducing apparatus cannot process the still images, display the images on a built-in display unit and record the images on a video cassette.

SUMMARY OF THE INVENTION

The present invention has been made in view of the above-stated respects. Namely, the disadvantages to be overcome are as follows. A conventional recording and reproducing apparatus cannot fetch still image signals recorded at a data rate different from that of video signals from a semiconductor memory or the like, at the date rate of video signals, display the still image signals processed by a personal computer and recorded on a semiconductor memory or the like on a display unit built in a digital camcorder, and record the still image signals on a videocassette.

To overcome these disadvantages, the present invention comprises conversion means for converting a signal at a data rate used for the transmission of, for example, still images into a signal at a data rate used for the transmission of video images. By using the conversion means, it is possible to convert a signal at a data rate used for the transmission of still images formed by another arbitrary equipment into a signal at a data rate used for the transmission of, for example, moving image signals used within a device, to display the signals on, for example, a display unit built in the device, to record the images as continuous video signals on a videocassette or the like, and to output the signals to an external unit.

BRIEF DESCRIPTION OF THE DRAWINGS

FIG. 3 is a block diagram showing the important parts of the recording and reproducing apparatus according to the present invention;

FIG. 4A–FIG. 4C are an explanatory view for the important parts shown in FIG. 3;

FIG. 5 is a concrete circuit diagram of a pre-filter in the recording and reproducing apparatus according to the present invention;

FIG. 6A–FIG. 6B are an explanatory view for the pre-filter;

FIG. 7 is a concrete circuit diagram of a thinning-out circuit in the recording and reproducing apparatus according to the present invention; and FIG. 8A–FIG. 8C are an explanatory view for the thinning-out circuit.

DETAILED DESCRIPTION OF THE PREFERRED EMBODIMENT

The present invention comprises conversion means supplied with signals at the first and second data rate used for the transmission of moving images and a signal at the third data rate used for the transmission of still images, for converting the signal at the third data rate into a signal at the first or second data rate.

Figure 1:
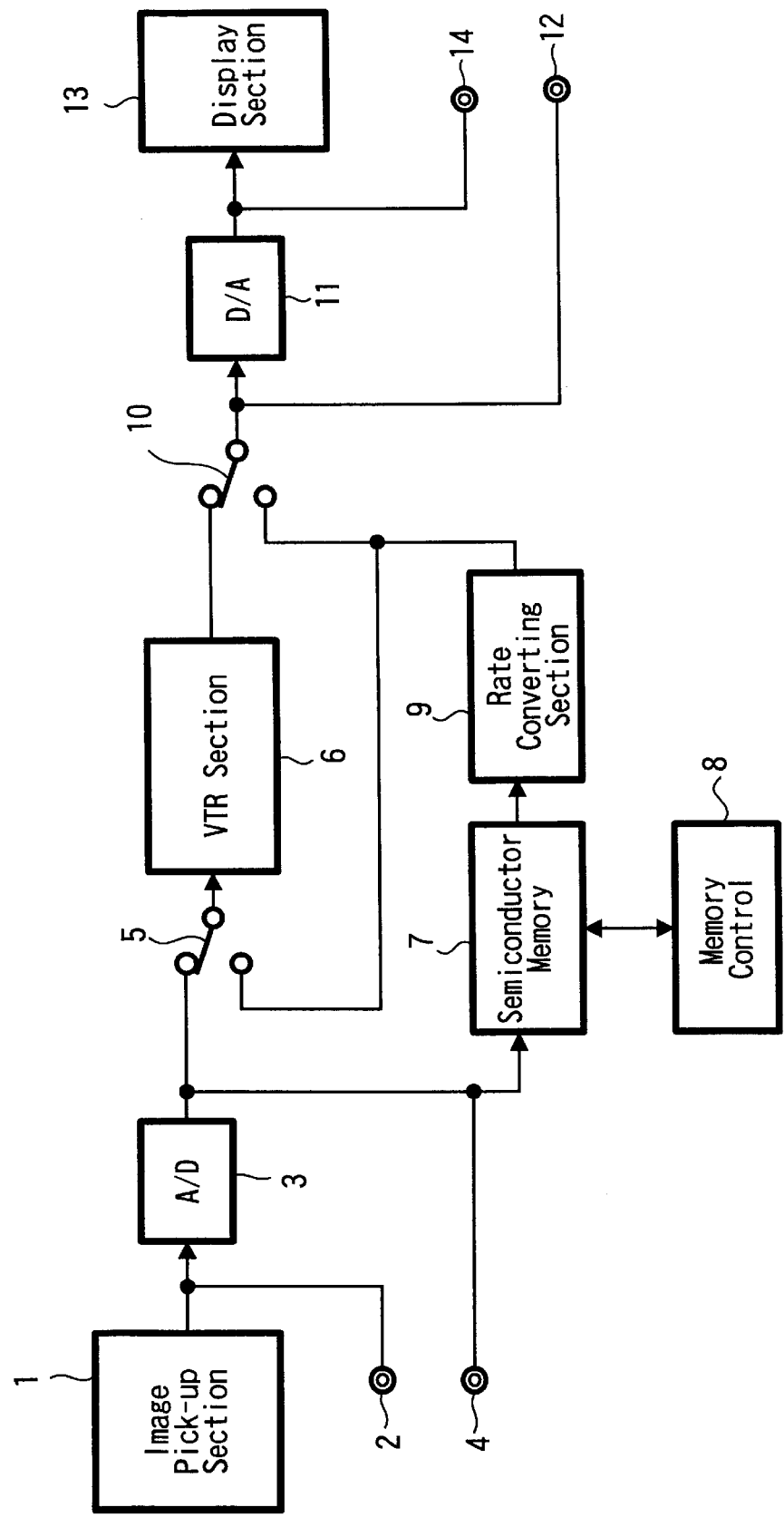
FIG. 1 is a schematic block diagram showing the constitution of one embodiment of a camcorder to which a recording and reproducing apparatus according to the present invention is applied.

The present invention will be described hereinafter with reference to the accompanying drawings. FIG. 1 is a schematic block diagram showing the constitution of one embodiment of a camcorder to which a recording and reproducing apparatus of the present invention is applied. It is noted that an abbreviation of VTR (Video_Tape_Recorder) will be used to describe the function of a video tape recorder provided in an device.

In FIG. 1, analog picture signals from an image pickup section 1 and from an analog input terminal 2 are supplied to an A/D (Analog_to_Digital) conversion circuit 3 and converted into digital picture signals by the circuit 3. The digital video signals converted by the A/D conversion circuit 3 and a digital picture signal from a digital input terminal 4 are supplied to a VTR section 6 through a change-over switch 5. As a result, the moving image video signals picked up by, for example, the image pickup section 1 or supplied to the analog input terminal 2 and the digital input terminal 4 are recorded on a magnetic recording medium (tape cassette which is not shown in FIG. 1) installed into the VTR section 6.

Further, the digital video signals from the A/D conversion circuit 3 and from the digital input terminal 4 are supplied to a semiconductor memory 7. This semiconductor memory 7 is controlled by a control signal from, for example, a memory control section 8, whereby still image signals each corresponding to an arbitrary one frame in the picture signals picked up by, for example, the image pickup section 1 or the picture signal supplied to the analog input terminal 2 or the digital input terminal 4 are digitally recorded on the semiconductor memory 7. It is noted that the semiconductor memory 7 is nonvolatile and detachable from an device.

In addition, since the semiconductor memory 7 is controlled by the control signal from, for example, the memory control section 8, still image signals recorded in, for example, the semiconductor memory 7 and each corresponding to one frame are repeatedly reproduced. A reproduction signal from the semiconductor memory 7 is supplied to a rate conversion circuit 9. The rate conversion circuit 9 detects the data rate of the reproduction signal based on an ID signal on the header portion of the signal. If the data rate, in the representation of a ratio of luminance signal (Y): first color signal (R-Y) second luminance signal (B-Y), is 4:4:4, then it is converted into 4:2:2 or 4:1:1. The detail of the rate conversion circuit 9 will be described later.

The digital video signal having a converted data rate is supplied from the rate conversion circuit 9 to the VTR section 6 through the change-over switch 5. As a result, a video signal in which the still image signals recorded in, for example, the semiconductor memory 7 and each corresponding to one frame are repeatedly reproduced, is recorded on the magnetic recording medium installed into the VTR section 6. In addition, the digital video signals repeatedly reproduced from the semiconductor memory 7 and having a data rate converted by the data conversion circuit 9 and the digital video signals reproduced from the VTR section 6 are selectively fetched at a switch 10.

Furthermore, the digital video signals fetched at the switch 10 are supplied to a D/A (Digital_to_Analog) conversion circuit 11 and, at the same time, fetched at a digital output terminal 12. Also, the analog video signals converted by the D/A conversion circuit 11 are supplied to a display section 13 consisting of a liquid crystal display unit or the like and built in the device and, at the same time, fetched at an analog output terminal 14.

Figure 2:
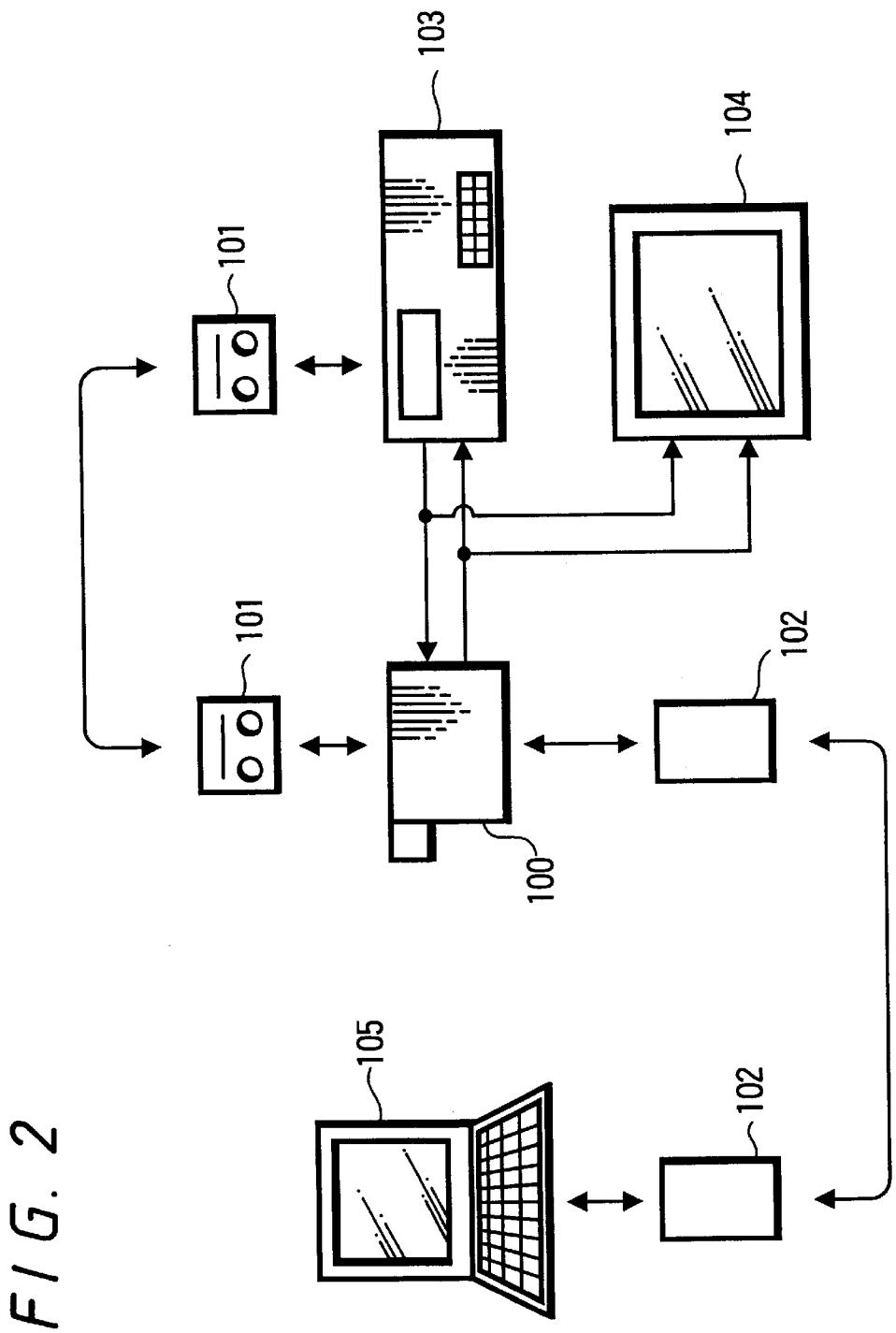
FIG. 2 is an explanatory view for the constitution of an overall system.

Thus, by employing the present device, a video signal of moving images picked up by or supplied to a camcorder device 100 is recorded on a tape cassette as shown in, for example, FIG. 2. The tape cassette 101 is then taken out and installed into a video tape deck 103, whereby the moving image video signal recorded on the tape cassette 101 is reproduced and displayed on, for example, an image receiver 104. It is noted that the moving image picture signal from the camcorder device 100 may be directly supplied to the video tape deck 103 or to the image receiver 104.

Further, arbitrary frames of the moving image video signal picked up by or supplied to the device 100 are recorded one by one as still image signals by a semiconductor memory 102. The semiconductor memory 102 is then taken out and installed into a personal computer 105, whereby the still image signals recorded on the semiconductor memory 102 are captured into the computer 105 and displayed on, for example, a monitor. In that case, it is not necessary to separately prepare a video signal capture circuit or the like. The still image signals can be captured by using the installation section or the like of the general purpose semiconductor memory 102.

The still image signals generated by, for example, the personal computer 105 can be recorded on the semiconductor memory 102 and supplied to the device 100. In that case, if the data rate of the still image signals recorded on the semiconductor memory 102 from the personal computer 105 is 4:2:2 or 4:1:1, the still image signals can be processed in the device 100 as they are. On the other hand, if the data rate of the still image signals recorded on the semiconductor memory 102 is 4:4:4, the rate is converted into 4:2:2 or 4:1:1 by the above-stated rate conversion circuit 9 and the still image signals are processed thereafter in the device 100.

Namely, in the rate conversion circuit 9, as shown in FIG. 3, a signal supplied at a data rate of 4:4:4 is supplied to a pre-filter 201 for converting a signal into a signal at a data rate of 4:2:2 and to a pre-filter 202 for converting a signal into a signal at a data rate of 4:1:1. Signals from the pre-filters 201 and 202 are supplied to a thinning-out circuit 203 for converting a data rate from 4:4:4 into 4:2:2 and a thinning-out circuit 204 for converting a data rate from 4:4:4 into 4:1:1, respectively. As a result, the data rate of the supplied signal is converted from, for example, 4:4:4 into 4:2:2 or 4:1:1 and then the signal is subjected to processing.

In the circuit 9, the pass bands of the pre-filters 201 and 202 are set as shown in, for example, FIG. 4. That is to say, if the sampling rate of a color signal at a data rate of, for example, 4:4:4 is that indicated by a right arrow in FIG. 4, the color signal at a data rate of 4:4:4 has a band shown in FIG. 4A. On the other hand, the pass band of the pre-filter 201 is limited to ½ of that of an original signal as shown in FIG. 4B. The pass band of the pre-filter 202 is limited to ¼ of that of the original signal as shown in FIG. 4C.

Thus, it is possible to eliminate trouble such as loop-back distortion resulting from thinning-out operation in the thinning-out circuits 203 and 204 in the rear stages of the circuit 9. That is, the sampling frequency of the color signal at a data rate of 4:2:2 is ½ of that of the original color signal at a data rate of 4:4:4. Due to this, the band of the color signal is limited to ¼ of the original sampling frequency, thereby making it possible to eliminate trouble such as loop-back distortion. Likewise, the band of a color signal at a data rate of 4:1:1 is limited to ⅛ of the original sampling frequency, thereby making it possible to eliminate trouble such as loop-back distortion.

FIG. 5 shows the concrete constitution of the pre-filters 201 and 202. Namely, as shown in FIG. 5, each of the pre-filters 201 and 202 is constituted by a digital filter for arbitrarily weighting a plurality of taps at every unit delay time. A color signal at a data rate of 4:4:4 supplied to, for example, an input terminal 20 is supplied to 16 data latch circuits 21$a$ to 21$p$ connected in series. Clock signals at the sampling rate of the color signal having a data rate of 4:4:4 are supplied from a terminal 22 to the clock terminals of the data latch circuits 21$a$ to 21$p$, respectively.

As a result, the data latch circuits 21$a$ to 21$p$ hold the respective sampling values of the color signal at a data rate of 4:4:4. Then, 17 taps are led out from the inputs/outputs of the data latch circuits 21$a$ to 21$p$ and signals obtained at these taps are supplied to multipliers 23$a$ to 23$q$ for weighting, respectively. Further, tap coefficients from ROM's (Read_Only_Memories) 24$a$ to 24$q$ are supplied to the multipliers 23$a$ to 23$q$, respectively. Signals weighted with the tap coefficients are added together by an adder 25 and fetched at an output terminal 26.

Further, tap coefficients for constituting a low-pass filter having a frequency of ¼ or ⅛ of the original sampling frequency stated above used as a cut-off frequency, are fetched from the ROM's 24$a$ to 24$q$ and supplied to the multipliers 23$a$ to 23$q$, respectively. In other words, to constitute a low-pass filter of this type, such tap frequencies as shown in FIG. 6 are employed. In the graph of FIG. 6, a curve of an SINC function (SinX/X), which is an ideal low-pass filter, is sampled equidistantly and symmetrically about a vertical axis and obtained sample values are used as the respective tap coefficients.

If a color signal at a data rate of 4:4:4 is converted into a signal at a data rate of 4:2:2, sample values at sampling intervals as shown in, for example, FIG. 6A are used as tap coefficients. If a color signal at a data rate of 4:4:4 is converted into a signal at a data rate of 4:1:1, sample values obtained by conducting sampling at a density twice as large as that used to convert the data rate into 4:2:2 are used as tap coefficients as shown in FIG. 6B. Although infinite taps are actually required, the infinite taps are unpractical to realize a low-pass filter. In this embodiment, therefore, the number of taps is limited to, for example, 17 to realize a low-pass filter.

Additionally, gain setting is made so that the sum of tap coefficients is 1. Consequently, a low-pass filter with frequency corresponding to ¼ or ⅛ of the original sampling frequency stated above used as cut-off frequency can be constituted. In that case, the above-stated pre-filters 201 and 202 can be realized with the same circuit arrangement only by changing over tap coefficients. Thus, tap coefficients for both filters 201 and 202 are stored in the ROM's 24a to 24q and changed over by a change-over signal from, for example, a terminal 27, whereby the pre-filters 201 and 202 can be realized with the same circuit arrangement.

FIG. 7 shows the concrete constitution of the thinning-out circuits 203 and 202. Each of the thinning-out circuits is constituted by a flip-flop 31 with an enable terminal. The color signal having a limited band is supplied from the pre-filters 201 or 202 to the data terminal D of the flip-flop 31, and a clock signal for a data rate of 4:4:4 is supplied to a clock terminal 33. The clock signal may be, for example, a signal shown in FIG. 8A. Sampling pulses both for a date rate of 4:2:2 and for a data rate of 4:1:1 as shown in FIGS. 8B and 8C, respectively, are supplied to terminals 34 and 35.

The sampling pulses from these terminals 34 and 35 are supplied to a change-over switch 36. The change-over switch 36 is selected by a change-over signal for changing over the data rate of the output signal from a change-over terminal 37 to 4:2:2 and 4:1:1. The selected sampling pulse is supplied to the enable terminal E of the flip-flop 31. The flip-flop 31 then fetches a signal only at the timing of each sampling pulse and thins out the signal. The thinned-out signal is fetched at an output terminal 38.

As can be seen, if a color signal at a data rate of, for example, 4:4:4 is thinned out so as to change the data rate to 4:2:2, the band of the color signal is first limited to ¼ of the original sampling frequency and then the color signal is thinned out so as to change the data rate to 4:2:2. If a color signal is thinned out so as to change the data rate of the signal to 4:1:1, the band of the color signal is first limited to ⅛ of the original sampling frequency and then the color signal is thinned out so as to change the data rate to 4:1:1. It is, thus, possible to convert data rate without trouble such as loop-back distortion.

In the above-stated device, the data rate an sampling frequency of an original signal is provided as, for example, an ID signal on the header portion of the signal. Due to this, the data rate and sampling frequency can be known by utilizing the ID signal. If a data rate desired by, for example, a user is set, whereby the data rate of the original signal is converted into a data rate desired by the user.

Therefore, the device according to the present invention is provided with conversion means for converting a signal at a data rate used for the transmission of, for example, still images into a signal at a data rate used for picture images, whereby a signal at a data rate used for the transmission of, for example, still images and formed in another arbitrary equipment can be converted into a signal at a data rate used for the transmission of, for example, moving images employed within the device, the converted signal can be displayed on, for example, a display unit built in the device and recorded as a continuous video signal on a videocassette or the like or outputted to an external unit.

According to the conventional recording and reproducing apparatus, still image signals recorded at, for example, a different data rate and supplied from a semiconductor memory or the like cannot be fetched at the data rate of, for example, video signals. Still image signals processed by, for example, a personal computer and recorded on a semiconductor memory or the like cannot be displayed on a display unit built in, for example, a digital camcorder or recorded on a videocassette. The present invention can easily overcome these conventional disadvantages.

It is noted that a combination of converted data rates employed in the above-stated apparatus should not be limited to the above combination. Besides, the contents of converted signals should not be limited to those of still image signals and moving image video signals as stated above.

According to the above-stated recording and reproducing apparatus, conversion means supplied with signals at the first and second data rates used for the transmission of moving images and a signal at the third data rate used for the transmission of still images, for converting the signal at the third data rate into a signal at the second data rate is provided. The provision of this conversion means allows a signal at a data rate used for, for example, the transmission of still images formed by another arbitrary equipment to be converted into a signal at a data rate used for the transmission of, for example, moving images, to be displayed on, for example, a display unit built in the apparatus and to be recorded on a videocassette or the like as a continuous vide signal or to be outputted to an external unit.

It is noted that the present invention should not be limited to the above-stated embodiment and that various changes and modifications can be made within the spirit of the present invention.

According to the invention recited in first aspect, conversion means for converting a signal at a data rate, for example, used for the transmission of still images into a signal at a data rate used for the transmission of moving images is provided. The provision of the conversion means allows a signal at the data rate, for example, used for the transmission of still images formed by another arbitrary equipment to be converted into a signal at a data rate, for example, used for the transmission of moving images used in a device, to display the converted signal on, for example, a display unit built in the device, to record the signal as a continuous video signal on a videocassette or the like or to output the signal to an external unit.

Further, according to the invention recited in second aspect, the conversion means has a pre-filter corresponding to the first and second data rates, and thinning-out means for converting the third data rate into the first and second data rates, respectively, whereby it is possible to conduct good data conversion without trouble such as loop-back distortion.

According to the invention recited in third aspect, the pre-filter is a digital filter for arbitrarily weighting a plurality of taps according to unit delay time, and has switching means for changing over tap coefficients according to the first data rate, whereby it is possible to conduct good data rate conversion with a simple constitution.

According to the invention recited in fourth aspect, the first data rate has a ratio of luminance signal: first color signal: second color signal of 4:2:2, the second data rate has a ratio of luminance signal: first color signal: second color signal of 4:1:1, and the third data rate has a ratio of luminance signal: first color signal: second color signal of 4:4:4. Thus, a still image processed by, for example, a personal computer can be well processed by the recording and reproducing device, displayed on a display unit built in the device, recorded on a videocassette or the like.

According to the conventional recording and reproducing apparatus, still image signals recorded at, for example, a different data rate and supplied from a semiconductor memory or the like cannot be fetched at the data rate of, for example, video signals. Still image signals processed by, for example, a personal computer and recorded on a semiconductor memory or the like cannot be displayed on a display unit built in, for example, a digital camcorder or recorded on a videocassette.

The present invention can easily overcome these conventional disadvantages.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A recording apparatus for recording a video signal, comprising:
   recording means for recording a video signal at a first data rate on a recording medium;
   input means for inputting a video signal at a second data rate; and
   converting means for converting the video signal at the, second data rate into a video signal at the first data rate, wherein the converting means converts the video signal at the second data rate into the video signal at the first data rate and the converted video signal is recorded on the recording medium;
   wherein the first data rate is a data rate used for transmission of a dynamic image, and the second data rate is a data rate used for transmission of a static image.

2. The recording apparatus according to claim 1, wherein the recording apparatus further comprises display means; and
   the converting means converts the video signal at the second data rate from the input means into a video signal at the first data rate, and the display means displays the converted video signal.

3. The recording apparatus according to claim 1, wherein the first data rate has a ratio of luminance signal: first color signal: second color signal of 4:2:2 or 4:1:1, the second data rate has a ratio of luminance signal: first color signal: second color signal of 4:4:4.

4. The recording apparatus according to claim 1, wherein the data rate of the video signal from the input means is detected from an ID signal on a header portion of the video signal, and if the detected data rate is the second data rate, the video signal is converted by the converting means.

5. The recording apparatus according to claim 1, wherein the converting means includes:
   a pre-filter for limiting a band of the video signal at the second data rate; and
   thinning-out means for converting an output signal of the pre-filter into a signal at the first data rate.

6. The recording apparatus according to claim 5, wherein the pre-filter is a digital filter for arbitrarily weighting a plurality of taps according to unit delay time, and has switching means for changing over tap coefficients according to the first data rate.

7. A recording and reproducing apparatus for recording and reproducing a video signal, comprising:
   first recording and reproducing means for recording and reproducing a video signal at a first data rate on and from a first recording medium;
   second recording and reproducing means for recording and reproducing a video signal at a second data rate on and from a second recording medium; and
   converting means for converting the video signal at the second data rate into a video signal at the first data rate, wherein the video signal at the second data rate reproduced from the second recording medium by second recording and reproducing means is converted into a video signal at the first data rate, and the converted video signal is recorded on the first recording medium by the first recording and reproducing means;
   wherein the first data rate is a data rate used for transmission of a dynamic image, and the second data rate is a data rate used for transmission of a static image.

8. The recording and reproducing apparatus according to claim 7, wherein the recording and reproducing apparatus further comprises display means; and the converting means converts the video signal at the second data rate reproduced by the second recording and reproducing means into a video signal at the first data rate, and display means displays the converted video signal.

9. The recording and reproducing apparatus according to claim 7, wherein the first data rate has a ratio of luminance signal: first color signal: second color signal of 4:2:2 or 4:1:1, the second data rate has a ratio of luminance signal: first color signal second color signal of 4:4:4.

10. The recording and reproducing apparatus according to claim 7, wherein the data rate of the video signal from the input means is detected from an ID signal on a header portion of the video signal, and if the detected data rate is the second data rate, the picture signal is converted by the converting means.

11. The recording and reproducing apparatus according to claim 7, wherein the converting means includes:
    a pre-filter for limiting a band of the video signal at the second data rate; and
    thinning-out means for converting an output signal of the pre-filter into a signal at the first data rate.

12. The recording and reproducing apparatus according to claim 11, wherein the pre-filter is a digital filter for arbitrarily weighting a plurality of taps according to unit delay time, and has switching means for changing over tap coefficients according to the first data rate.

13. A recording method of recording a video signal, comprising:
    a recording step of recording a video signal at a first data rate on a recording medium;
    an input step of inputting a video signal at a second data rate; and
    a conversion step of converting the video signal at the second data rate into a video signal at the first data rate;
    wherein the first data rate is a data rate used for transmission of a dynamic image, and the second data rate is a data rate used for transmission of a static image.

14. The recording method according to claim 13, further comprising a display step of displaying the video signal obtained in the conversion step.

15. The recording method according to claim 13, wherein the first data rate has a ratio of luminance signal: first color signal: second color signal of 4:2:2 or 4:1:1, the second data rate has a ratio of luminance signal: first color signal: second color signal of 4:4:4.

16. The recording method according to claim 13, wherein the data rate of the inputted video signal is detected from an ID signal on a header portion of the inputted video signal, and if the detected data rate is the second data rate, the conversion step is carried out.

17. A recording and reproducing method of recording and reproducing a video signal, comprising:

a reproduction step of reproducing a video signal at a second data rate from a second recording medium;

a conversion step of converting the video signal at the second data rate reproduced in the reproduction step into a video signal at a first data rate; and a recording step of recording the video signal at the first data rate obtained in the conversion step on the first recording medium;

wherein the first data rate is a data rate used for transmission of a dynamic image, and the second data rate is a data rate used for transmission of a static image.

18. The recording and reproducing method according to claim 17, further comprising a display step of displaying the video signal obtained in the conversion step.

19. The recording and reproducing method according to claim 17, wherein the first data rate has a ratio of luminance signal: first color signal: second color signal of 4:2:2 or 4:1:1, the second data rate has a ratio of luminance signal: first color signal: second color signal of 4:4:4.

20. The recording and reproducing method according to claim 17, wherein the data rate of the inputted video signal is detected from an ID signal on a header portion of the inputted video signal, and if the detected data rate is the second data rate, the conversion step is carried out.

* * * * *